(12) United States Patent
Salisbury et al.

(10) Patent No.: US 9,083,875 B2
(45) Date of Patent: Jul. 14, 2015

(54) USER-PROFILE SYSTEMS AND METHODS FOR IMAGING DEVICES AND IMAGING DEVICES INCORPORATING SAME

(71) Applicant: Thermoteknix Systems Ltd., Cambridge (GB)

(72) Inventors: Richard Salisbury, Cambridge (GB); Robin Tucker, Ely (GB)

(73) Assignee: Thermoteknix Systems Ltd., Waterbeach, Cambridge (GB)

( * ) Notice: Subject to any disclaimer, the term of this patent is extended or adjusted under 35 U.S.C. 154(b) by 305 days.

(21) Appl. No.: 13/621,975

(22) Filed: Sep. 18, 2012

(65) Prior Publication Data

US 2013/0031502 A1 Jan. 31, 2013

Related U.S. Application Data

(62) Division of application No. 12/820,525, filed on Jun. 22, 2010, now abandoned.

(51) Int. Cl.
*H04N 5/232* (2006.01)

(52) U.S. Cl.
CPC ..................... *H04N 5/232* (2013.01)

(58) Field of Classification Search
USPC .......................................................... 715/771
See application file for complete search history.

(56) References Cited

U.S. PATENT DOCUMENTS

| | | | |
|---|---|---|---|
| 5,637,871 A | 6/1997 | Piety et al. | |
| 5,821,946 A * | 10/1998 | Nakagawa | .................... 345/473 |
| 7,154,093 B2 | 12/2006 | Lannestedt | |
| 7,428,069 B2 | 9/2008 | Fujio et al. | |
| 7,522,770 B2 | 4/2009 | Steinberg | |
| 2002/0054224 A1 | 5/2002 | Wasula et al. | |
| 2002/0156834 A1* | 10/2002 | Kitada et al. | .................. 709/203 |
| 2002/0168104 A1 | 11/2002 | Muramoto | |
| 2003/0071126 A1* | 4/2003 | Waxelbaum | ............ 235/462.25 |
| 2003/0103088 A1 | 6/2003 | Dresti et al. | |
| 2003/0177930 A1* | 9/2003 | Derhak et al. | ................ 101/484 |
| 2003/0184650 A1 | 10/2003 | Brown et al. | |
| 2004/0049344 A1 | 3/2004 | Simon et al. | |
| 2004/0135887 A1 | 7/2004 | Tecu et al. | |

(Continued)

FOREIGN PATENT DOCUMENTS

EP 1848148 A1 10/2007

OTHER PUBLICATIONS

Dr. Richard Salisbury; Thermal Imaging and Predictive Maintenance: What the Future has in Store; May 2000; IEEE; 11 Pages.*

(Continued)

*Primary Examiner* — Andrew Dyer
(74) *Attorney, Agent, or Firm* — Downs Rachlin Martin PLLC

(57) ABSTRACT

User-profile systems and methods that allow the users of imaging devices to create, store and retrieve user profiles that allow users to readily set operating parameters of the imaging devices. Such user profiles are useful, for example, in situations where a user encounters differing imaging scenarios having differing preferred operating-parameter settings. The user can change the operating parameter settings to the desired settings by selecting the user profile corresponding to the imaging scenario at hand. In one embodiment, the imaging device displays a user-profile-access list to the user from which the user can select a desired one of the user profiles.

9 Claims, 12 Drawing Sheets

(56) References Cited

U.S. PATENT DOCUMENTS

| | | |
|---|---|---|
| 2004/0179122 A1 | 9/2004 | Morimoto et al. |
| 2004/0202378 A1 | 10/2004 | Rising et al. |
| 2005/0088525 A1 | 4/2005 | Stavely et al. |
| 2005/0093888 A1* | 5/2005 | Rao .............................. 345/629 |
| 2005/0267749 A1 | 12/2005 | Yamada et al. |
| 2006/0050982 A1 | 3/2006 | Grosvenor |
| 2006/0072028 A1* | 4/2006 | Hong ....................... 348/333.01 |
| 2006/0077405 A1 | 4/2006 | Topfer et al. |
| 2006/0258397 A1 | 11/2006 | Kaplan et al. |
| 2006/0289768 A1 | 12/2006 | Vallese et al. |
| 2007/0016868 A1* | 1/2007 | Nurmi ........................... 715/738 |
| 2007/0242138 A1 | 10/2007 | Manico et al. |
| 2008/0209350 A1 | 8/2008 | Sobotka et al. |
| 2008/0305815 A1* | 12/2008 | McDonough .................. 455/466 |
| 2009/0231441 A1 | 9/2009 | Walker et al. |
| 2009/0276485 A1 | 11/2009 | Casassovici |
| 2010/0124902 A1 | 5/2010 | Hoh et al. |
| 2011/0122293 A1* | 5/2011 | Yamada et al. ............ 348/231.6 |

OTHER PUBLICATIONS

Canon EOS Digital Rebel XTi/400D Digital Instruction manual; Aug. 2006; Canon Inc.; pp. 1-180.

Nikon D1 User's Manual; 2002; Nikon USA, pp. 1-144.

Office Action dated Apr. 18, 2012, in connection with related U.S. Appl. No. 12/820,525, filed Jun. 22, 2010, Salisbury; pp. 1-34.

* cited by examiner

USER-PROFILE SYSTEMS AND METHODS FOR IMAGING DEVICES AND IMAGING DEVICES INCORPORATING SAME

RELATED APPLICATION DATA

This application is a divisional of U.S. Nonprovisional Patent Application Ser. No. 12/820,525, filed on Jun. 22, 2010, and titled "User-Profile Systems and Methods for Imaging Devices and Imaging Devices Incorporating Same", which is incorporated herein by referenced in its entirety.

FIELD OF INVENTION

The present disclosure generally relates to imaging devices. In particular, the present disclosure is directed to user-profile systems and methods for imaging devices and imaging devices incorporating same.

BACKGROUND

Many imaging devices often have a wide variety of operating parameters that can be set by the users of these devices. For example, some contemporary thermographic cameras, such as the VisIR® handheld infrared cameras currently available from Thermoteknix Systems Ltd, Cambridge, United Kingdom, allow users to set not only parameters that control how the cameras capture images but also to set parameters that control how images are presented to the users, for example, on graphic displays built into the cameras, to set parameters relating to thermographic tools available to the users, and to set parameters for how the images are handled within the cameras.

SUMMARY

In one implementation, the present disclosure is directed to a method changing at least one operating parameter of an imaging device to adapt the imaging device to an imaging scenario. The method includes: storing on the imaging device a plurality of user profiles each having associated therewith at least one operating parameter setting, wherein each of the plurality of user profiles corresponds to a respective imaging scenario; storing on the imaging device a plurality of scenario identifiers corresponding respectively to the plurality of user profiles; allowing the user to select a desired one of the user profiles as a function of the corresponding respective one of the plurality of scenario identifiers; and in response to detecting a user selection of the desired one of the user profiles, implementing in the imaging device the at least one operating parameter setting associated with the desired one of the user profiles.

In another implementation, the present disclosure is directed to a machine-readable medium containing non-transitory machine-executable instructions for performing a method changing at least one operating parameter of an imaging device to adapt the imaging device to an imaging scenario. The non-transitory machine-executable instructions include: a first set of machine-executable instructions for storing on the imaging device a plurality of user profiles each having associated therewith at least one operating parameter setting, wherein each of the plurality of user profiles corresponds to a respective imaging scenario; a second set of machine-executable instructions for storing on the imaging device a plurality of scenario identifiers corresponding respectively to the plurality of user profiles; a third set of machine-executable instructions for allowing the user to select a desired one of the user profiles as a function of the corresponding respective one of the plurality of scenario identifiers; and a fourth set of machine-executable instructions for implementing in the imaging device the at least one operating parameter setting associated with the desired one of the user profiles in response to detecting a user selection of the desired one of the user profiles In a further implementation, the present disclosure is directed to an imaging device having operating parameters settable by a user. The imaging device includes: an image-sensor system having a first sensor for acquiring images; a user-interface system configured to display images acquired by the image-sensor system and to display a graphical user interface to a user; a user-profile manager that: stores on the imaging device a plurality of user profiles each having associated therewith at least one operating parameter setting, wherein each of the plurality of user profiles corresponds to a respective imaging scenario; stores on the imaging device a plurality of scenario identifiers corresponding respectively to the plurality of user profiles; allows the user to select a desired one of the user profiles as a function of the corresponding respective one of the plurality of scenario identifiers; and in response to detecting a user selection of the desired one of the user profiles, implements in the imaging device the at least one operating parameter setting associated with the desired one of the user profiles; and a memory system for storing the user-profile settings data and storing the at least one scenario identifier in association with the user-profile settings data.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

DETAILED DESCRIPTION

The present disclosure is directed to user-profile systems and methods for imaging devices, as well as imaging devices utilizing ones of such systems and methods. As described in the Background section above, imaging devices typically have user-settable parameters for controlling one or more aspects of their operation. In some circumstances, for example, users prefer certain settings for particular imaging scenarios or certain settings are known to yield desired results, and preferred settings can vary from one user to the next and/or from one imaging scenario to another. In one embodiment, one or more users can create and save one or more user-profiles, each of which contains user-desired settings for operating parameters of the imaging device for a particular imaging scenario. After saving of the user-profile(s), a user can select any profile for use in an imaging scenario wherein the user desires the saved setting(s) to be implemented. In response to the selection of a user profile, the relevant parameters of the imaging device are automatically set to the settings saved in that profile. As should be apparent from this brief overview and as described below in detail, user-profile systems and methods of the present disclosure can greatly simplify the process of changing imaging devices from one set of settings to another.

Prior to providing a specific detailed example in the context of a combined thermographic/visible-light camera (i.e., a specific imaging device), concepts implemented in that example are first described more broadly immediately below to give the reader an explicit understanding that the broad concepts indeed can have applicability to other types of imaging devices, such as photographic still cameras (e.g., SLRs, point-and-shoots, etc.), video cameras, infrared-only cameras, optical scanners, and photocopiers, among others. After reading this entire disclosure, those skilled in the art will appreciate the broad range of applications to which concepts disclosed herein can be applied.

Figure 1:
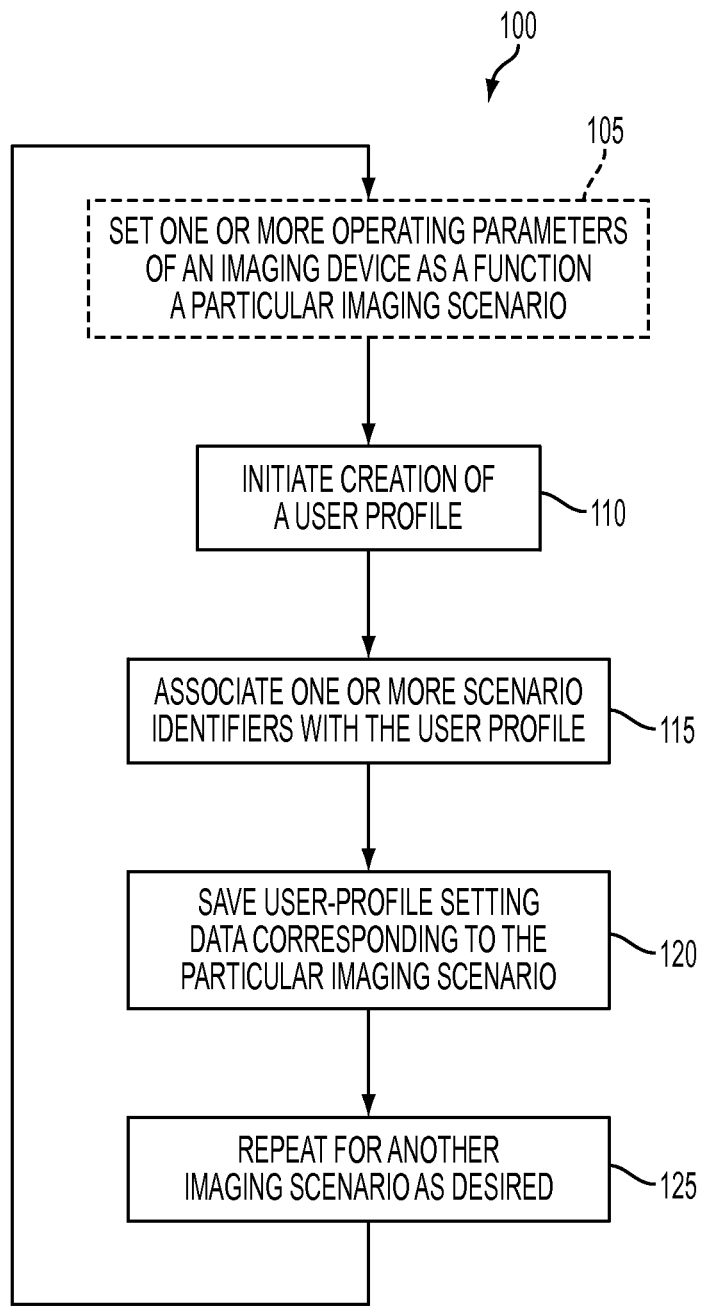
FIG. 1 is a flow diagram illustrating a method of setting up a user-profile in an imaging device.

Referring now to the drawings, FIG. 1 illustrates an exemplary method 100 for creating and storing one or more user profiles, each of which, as mentioned above, includes settings data for setting various operating parameters of the imaging device at issue. At step 105, various parameters of the imaging device at issue are set by a user to desired settings for a particular imaging scenario. As used herein and in the appended claims, the term "imaging scenario" and like terms refer to a scenario involving capturing, viewing, saving, manipulating, applying tools to an image or set of images, and sending of images to an external device, individually and in any combination thereof. Regarding image capturing, imaging scenarios can arise from preferred, desired and/or necessary image-capture conditions, such as type of subject, subject lighting, subject movement, subject temperature and photographic effect (e.g., stop motion, effect of motion, such as background blur, etc.), among others. As for image viewing, imaging scenarios can arise from preferred, desired and/or necessary conditions of viewing images on a graphical display, such as display intensity, color palette, size of displayed image, number of images displayed at once, type of images displayed at once (e.g., a visible-light image displayed at the same time as a thermographic image), orientation of displayed image, display of image metadata, such as histogram(s), aperture setting and shutter speed, among others. Concerning image saving, imaging scenarios can arise from preferred, desired or necessary conditions of file type (e.g., RAW, jpeg, etc.), image size (resolution), file naming convention and storage location, among others. Regarding applying tools, imaging scenarios can arise from preferred, desired and/or necessary application of tools, such as a spot-temperature tool for thermographic images, an areal-average-temperature tool for thermographic images, an overexposure alert tool for visible-light images, etc. Regarding sending of images to an external device, imaging scenarios can arise from preferred, desired and/or necessary conditions of sending of images to a external device, such as a computer, for example, using any wired or wireless communications system and/or protocol. For example, in some imaging scenarios it may be desired to send captured images directly to a computer via an available wireless router, whereas in other scenarios wherein such wireless communication is not available, the image can be saved locally on the imaging device. Step 105 is shown in phantom lines because, for example, in a case wherein the parameters of the imaging device are already set to the intended settings, this step need not be performed.

At step 110, the creation of a user profile is initiated. From a user's perspective, this step can be achieved using any of a variety of means, including making selections from a menu-based graphical user interface (GUI) running on the imaging device at issue, actuating one or more hard and/or soft controls on the imaging device, speaking one or more commands to a voice-recognition system on the imaging device, or providing instructions using any suitable input means, and any combination thereof. From the imaging device's perspective, step 110 can include the electronic creation of the user-profile in response to input received from the user, for example, by any of the means just mentioned. This creating of the user profile can be performed, for example, by implementing conventional file creation software instructions and/or database management software, as will be known by those skilled in the art.

Figure 2:
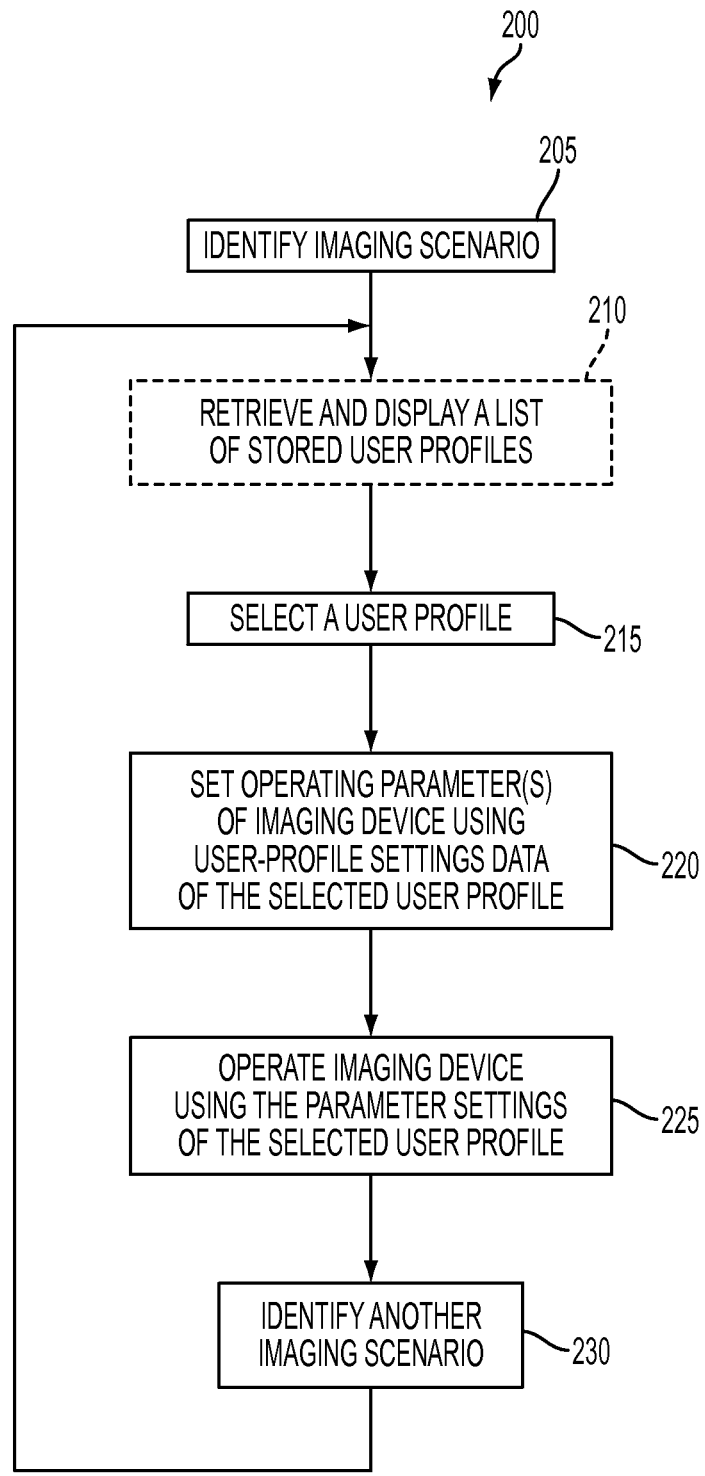
FIG. 2 is a flow diagram illustrating a method of implementing a user-profile system in an imaging device.

At step 115, one or more scenario identifiers are associated with the user profile to facilitate retrieval of the profile after it has been saved. A scenario identifier can be any of a wide variety of items that can be used to identify the user profile to a user and/or be used to select the profile and/or apply the settings stored in the profile in response to the selection. Example scenario identifiers include descriptive names (e.g., "Timothy's Kiln Preferences", "Fuse Boxes with Image Tools", "Fuse Boxes without Image Tools", "Motor Control Center H-32", "Backlit Subject", "John's Image-Scanning Preferences", "Jeff's Image Display Settings", etc.), an image corresponding to the imaging scenario (e.g., a stock or previously captured image of the same or similar subject, a stock or previously captured image showing photographic effect(s) desired in the imaging scenario, such as stop motion of a relatively fast subject, motion blur, etc.), an aural note (e.g., a recorded voice note describing the imaging scenario and/or settings in the file) and an identifier suitable for efficient bar-coding (e.g., a numeral in a sequential series of numerals, etc.). It is noted that multiple scenario identifiers of like and/or different types can be associated with the same user profile. For example, a particular user profile might have associated therewith each of a descriptive name, a previously captured visible-light image, a previously captured thermal image, a voice note and a bar-coding identifier. FIG. 2 and accompanying description provide examples of roles scenario identifiers can play in the use of a user profile.

From a user's perspective, step 115 can be achieved using any of a variety of means suitable for the particular scenario identifier at issue. For example, a user can input into the imaging device a descriptive name using a hard or soft keyboard (e.g., a QWERTY-style keyboard or a phone-style keyboard) or using a voice-recognition system. For stock images, if the images are pre-loaded onto the imaging device, the user can select each image in a GUI, for example, using a user-profile manager screen. If the stock image(s) are not pre-loaded, the user could, for example, upload the desired image(s) or first load a set of images and then select the desired one(s). Similarly, if a desired-image is one that was previously captured using the imaging device, the user can select that image using a GUI running on the imaging device. Previously captured images that have already been off-loaded from the imaging device can be reloaded into the imaging device using any suitable means, for example, wireless or wired transfer or via a memory card. Aural notes can be, for example, created as digital audio files using sound recording functionality built into the imaging device, if any, or can be created off-board the imaging device and imported to the device in any suitable manner. Barcode identifiers could be manually input by a user, for example, via a user-profile manager running on the imaging device or could be assigned automatically by a user-profile manager or other application.

From the imaging device's perspective, step 115 can include receiving one or more scenario identifiers from the user and/or another device on which the identifier(s) are stored or input by the user. In an exemplary embodiment, a user can use a GUI of a user-profile manager running on the imaging device to control the input of the scenario identifiers into the imaging device. Step 115 can also include the association, or linking, of each scenario identifier to the corresponding user-profile settings data. This, too, can be handled by a user-profile manager onboard the imaging device. As described below in connection with FIG. 2, this association allows the scenario identifiers to be used as selection tools that allow the user to select a desired user profile and cause the imaging device to be set to the operating parameter settings using user-profile settings data corresponding to the selected scenario identifier.

At step 120, the user-profile settings data, which include current imaging device parameter settings, are saved for later retrieval and use. This step may also involve saving each of the scenario identifiers associated with a particular set of user-profile settings data. From the user's perspective, step 120 can involve the user actuating/selecting a hard or soft control, an icon, a hyperlink, etc., for example, in a user-profile manager running on the imaging device. Such a selectable/actuatable item may indicate "Save Profile", "Save and Exit", or the like. From the imaging device's perspective, step 120 can involve receiving an indication that the user wants to save current imaging device parameter settings and then carrying out the necessary software instructions for effecting the save. For example, step 120 may involve moving settings data from short-term memory to long-term memory, querying various imaging device systems for parameter settings, among others. It is noted that steps 110, 115 and 120 do not necessarily need to be performed in that order. Rather they may be performed in a different order, and some can be performed substantially simultaneously with one another. For example, step 110 of creating a user profile may automatically trigger the simultaneous saving of the user-profile settings data at step 120. In this case, step 115 of associating one or more scenario identifiers with the user profile can occur after step 120.

At step 125, steps 105, 110, 115 and 120 can be repeated as many times as the one or more users of an imaging device desire to set up user profiles. Such repeating of those steps can occur at virtually any time throughout the life of the imaging device to create a library of user profiles.

FIG. 2 illustrates a method 200 of implementing one or more user profiles in an imaging device. Each of the user profiles may have been created using method 100 of FIG. 1. Referring to FIG. 2, method 200 can begin at step 205, in which an imaging scenario is identified. From a user's perspective, the step can involve the user recognizing a particular imaging scenario for which the user would like to use the imaging device with certain operating parameter settings and at least suspecting that the imaging device contains a saved user profile having those settings. For example, the imaging device may be a thermographic camera, and the desired settings may involve settings for thermographic tools and color palette for the thermal image. From the imaging device's perspective, step 205 can involve direct identification of the imaging scenario, for example, via image recognition or barcode input (see below explanation of these relative to step 215).

At optional step 210, a list of user profiles already saved and stored on the imaging device is retrieved and displayed. From the user's perspective, this step can involve for example, the user actuating a hard or soft control, such as a button, icon or hyperlink, or navigating on one or more screens of a GUI of a user-profile manager running on the imaging device. From the imaging device's perspective, step 210 can include receiving an indication from the user to display the list and then retrieving and displaying the list. This step is optional because in some embodiments, such as embodiments wherein image recognition and/or barcodes are used, the user does not have to make a selection from among a list, and, consequently, the user does not need to see the list. That said, the list can be displayed, if desired, for example showing the selected imaging scenario highlighted.

At step 215, a desired one of the one or more stored user profiles is selected. From the user's perspective, this can be accomplished, for example, by viewing a list of available user profiles and selecting the desired user profile from the list using any available selection means, such as a touch screen, joy stick, touchpad, multi-directional toggle, hard or soft button, etc. For example, thumbnails of images used as scenario identifiers can be displayed as selectable icons or hyperlinks that, when selected, cause the imaging device to retrieve the corresponding user-profile settings data. Similarly, descriptive names can be used as icons or hyperlinks to the corresponding respective user-profile settings data. As another example, if the imaging device includes a barcode reader or is in communication with a barcode reader, the user can use the reader to read a barcode, which a user-profile manager running on the imaging device will use to retrieve the corresponding user-profile settings data. In this connection, in a thermographic-imaging context, barcodes could be placed onto or in proximity to pieces of equipment or other imaging subjects. Alternatively, barcodes could be printed on sheets of paper that the thermographer carries during an imaging session. As those skilled in the art will readily appreciate, other barcode scenarios are possible.

In yet another example, if one of the scenario identifiers used is a previously captured image of a particular subject, for example, a piece of equipment being thermographed, a selection process can involve image recognition. In one embodiment, before capturing a desired image of the subject, the user could capture a "pre-image" of the subject. The imaging device would then subject this pre-image to one or more image-recognition algorithms that would then determine whether or not the subject matches any of the previously stored image-type scenario identifiers. If a match is found, in some embodiments the imaging device may be configured to automatically change the operating parameters of the imaging device to the settings contained in the corresponding user-profile settings data, perhaps with some sort of confirmation being provided by the imaging device to the user that the change has been made. Such an indication can be, for example, an aural indication (e.g., a tone, spoken word or phrase, etc.), visual indication (e.g., pulsing of a light, display of a pop-up message on a graphical display etc.) or a tactile indication (e.g., a momentary vibration of the imaging device or component thereof), or any combination thereof, among others. In other embodiments, the imaging device may be configured to ask the user to confirm that imaging scenario that the device has identified through image recognition is the correct one. This can be done by identifying to the user the imaging scenario, for example, by displaying (e.g. visually or aurally) any one or more of the scenario identifiers and requiring the user to either accept or reject the identified scenario. The imaging device can be configured to receive an acceptance or rejection of the identified scenario in any one or more of a number of ways. For example, the imaging device could require the user to actuate a hard control or soft control, select an icon or speak a command, among others.

From the imaging device's perspective, step 215 can involve receiving an indication from the user to retrieve a certain user profile and, in response thereto, retrieving the corresponding user-profile settings data. At step 220, operating parameters of the imaging device are automatically set according to the settings data corresponding to the selected user profile. Step 220 may be performed in any manner that suits the architecture of the imaging device. Those skilled in the art will readily understand how step 220 can be executed given the device architecture at issue. As an example, settings from the settings data can be loaded into settings registers within imaging device control circuitry that are used for changing parameter settings.

At step 225, the imaging device is operated using the parameter settings saved in the selected user profile. From the user's perspective, this step can include the user operating the camera using various imaging device controls and features, such as shutter release actuator, live view, image-review, and imaging tools, such as a spot temperature tool and an areal average temperature tool, among others. From the imaging device's perspective, step 225 can include receiving commands from the user from one or more user interface controls, for example, shutter release actuator, touch screen controls, joy stick, multi-directional toggle, touchpad, among others, and provide the functionality corresponding to those commands in accordance with the operating parameter settings in the selected user profile.

At step 230, another imaging scenario is identified, and method 200 proceeds back to step 210 and repeats steps 210, 215, 220, 225 and 230. This cycling can continue as many times as the one or more users desire to implement a saved user profile.

Figure 3:
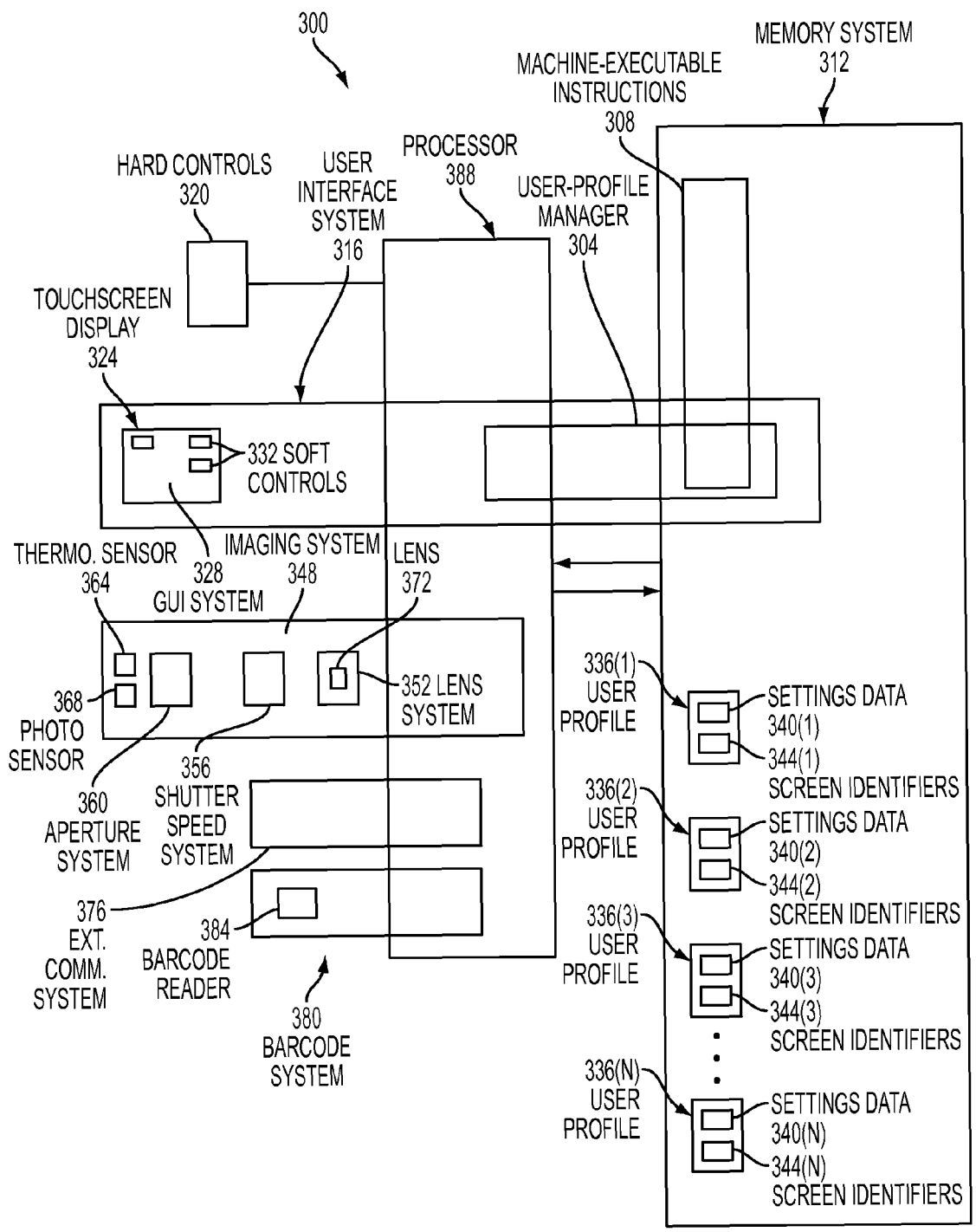
FIG. 3 is a high-level block diagram of an imaging device implementing a user-profile manager.

FIG. 3 illustrates an exemplary imaging device 300 that includes systems for implementing user-profile methods 100 and 200 of FIGS. 1 and 2, respectively. In this example, user profile functionality is enabled in imaging device 300 by a user-profile manager 304, which in the embodiment shown is a software-based utility having machine-executable instructions 308 stored in a memory system 312 onboard the imaging device. Also in the example shown, user-profile manager 304 utilizes a user interface system 316 that can include one or more hard controls 320, for example, mechanical buttons, joystick, multi-direction toggle, click-wheel, touchpad, etc. and at least one graphical display, which in this example is a touchscreen display 324. Touchscreen display 324 is particularly useful in this embodiment because user-profile manager 304 is a GUI-based application that presents various informational and interactive GUI screens 328 to the user via the display. Each GUI screen 328 can be provided with one or more soft controls 332, such as soft buttons, selectable icons, selectable hyperlinks, etc. that a user can select by appropriately touching the touchscreen display 324 and/or using another input device, such as a joystick, multi-direction toggle, click-wheel, touchpad, etc.

Memory system 312 can include short-term memory, read-only memory, long-term read-write memory, onboard memory, removable memory and any combination thereof. In one example, machine-executable instructions 308 are stored in onboard, long-term read-write memory to ensure availability of user-profile manager 304 and to allow the instructions to be updated via software updates. Such memory can also include machine-executable instructions (not shown) that provide imaging device 300 with other functionality. FIG. 3 illustrates memory system 312 as also containing a plurality of saved user profiles 336(1) through 336(N), wherein N is the highest value in an increasing series of integers starting from one. Each of these user profiles 336(1) through 336(N) has the functionality described above in connection with FIGS. 1 and 2 and includes corresponding saved user-profile settings data 340(1) through 340(N) and at least one associated scenario identifier 344(1) through 344(N). User profiles 336(1) through 336(N) could also be stored in onboard, long-term read-write memory to ensure their availability and to allow them to be readily added to, deleted and changed. Those skilled in the art will readily understand how to provide imaging device 300 with a suitable memory system 312 that is suitable for the type of imaging device.

Imaging device 300 also includes an imaging system 348 which can include a lens system 352, a shutter-speed system 356, and an aperture system 360. In the example shown, imaging device 300 is a thermographic camera capable of capturing not only thermographic images, but visible-light images, as well. As such, imaging system 348 includes a thermographic sensor 364 and a photographic sensor 368 and any necessary supporting circuitry (not shown), such as image-processing circuitry for processing raw sensor data. Lens system 352 includes one or more lenses 372 and any necessary lens controller (not shown) for controlling the operation of the lens(es), such as autofocus and aperture-setting. Shutter-speed system 356 and aperture system 360 include controllers (not shown) suitable for controlling shutter speed and aperture, depending upon the type of sensor(s) and lens(es) used. These systems are well known for a wide variety of imaging devices and, so, do not need to be described in detail.

In this embodiment, imaging device 300 further includes an external communications system 376 and a barcode-reading system 380, each of which is briefly described below, since those skilled in the art will readily understand how to implement each of these systems. External communications system 376 can include any wired or wireless communications devices, such as any one or more of USB, Firewire, Ethernet ports, one or more radio transceivers, such as a Bluetooth transceiver, WiFi transceiver, etc., and/or an infrared transceiver, among others, for transmitting information from and to imaging device 300. Information transmitted can include images captured using imaging device 300, software updates, new software for enhancing functionality of the device, user profiles and stock and other previously captured images for use as scenario identifiers, among other things. Barcode reading system 380 includes a barcode reader 384 and corresponding software for reading barcodes, for example, for the purposes described above relative to FIG. 2 and method 200.

As those skilled in the art will readily appreciate, FIG. 3 is largely a functional diagram and, therefore, does not depict specific hardware that implements these systems. However, those skilled in the art will readily recognize that such hardware will typically include one or more processors (one processor 388 shown for convenience) for executing machine-executable instructions, such as instructions 308, for providing imaging device 300 with its functionality and other circuitry (not shown) that allows various ones of systems 312, 316, 348, 352, 356, 360, 376, and 380 to communicate and/or otherwise interact with one another and/or with the one or more processors 388. Those skilled in the art will also recognize that the functional abstraction of FIG. 3 typically also leads to the fact that at least some of system 312, 316, 348, 352, 356, 360, 376, and 380 overlap various components of the hardware. For example, user-interface system 316 may overlap touchscreen display 324, processor 388, memory system 312 and specialized display-driver circuitry (not shown). Those skilled in the art will understand the various overlaps that may be present in a particular imaging device they are designing.

In this example, user-profile manager 304 handles all aspects of the user-profile features, including creating, storing and retrieving user profiles, identifying when a user has selected a user profile, identifying a user profile (e.g., via image recognition or barcode) and setting operating parameters of imaging device 300 using a selected one of user-profile settings data 340(1) through 340(N). User-interface system 316 is linked to user-profile manager 304 because one or more of the settings in user-profile settings data 340(1) through 340(N) can apply to operational settings of touchscreen display 324, such as backlighting intensity. In addition, user-profile manager 304 passes information to user-interface system 316, such as to provide GUI screens 328 to touchscreen display 324, and passes information from the user-interface system to the user-profile manager, such as to provide indications of the actuation of hard and soft controls 320, 332.

User-profile manager 304 links to memory system 312 not only because of the interaction resulting from the storage and retrieval of user profiles 336(1) through 336(N), but also because the memory system also includes machine-executable instructions 308 that underlie the user-profile manager. User-profile manager 304 also links to each of imaging system 348, lens system 352, shutter-speed system 356, aperture system 360, external communications system 376 and barcode-reading system 380 because the user-profile manager either can control one or more operating parameters of that system or otherwise communicates with that system, or both. For example, user-profile manager 304 can change operating parameters of imaging system 348, such as the sensitivity of either or both of sensors 364, 368 and type of file created by the imaging system (e.g., RAW, JPEG, etc.). In addition, if the image-recognition feature is used, it may be implemented in a way that user-profile manager 304 receives a captured image to be analyzed directly from imaging system 348. User-profile manager 304 can also change operating parameters of shutter-speed system 356, aperture system 360, and/or external communications system 376. Regarding barcode-reading system 380, user-profile manager 304 can be configured to receive barcode data from barcode reader 384.

FIGS. 4-14 and the following description thereof illustrate various user-profile features discussed above in the context of a handheld camera 400 (FIGS. 4-6) that has both a thermographic sensor for capturing thermographic images and a visible-light sensor for capturing photographic images, typically at the same time the camera captures corresponding thermographic images. In one example, camera 400 is an IR/visible imaging camera similar to the VisIR® 640 camera mentioned in the Background section above.

Figure 4:
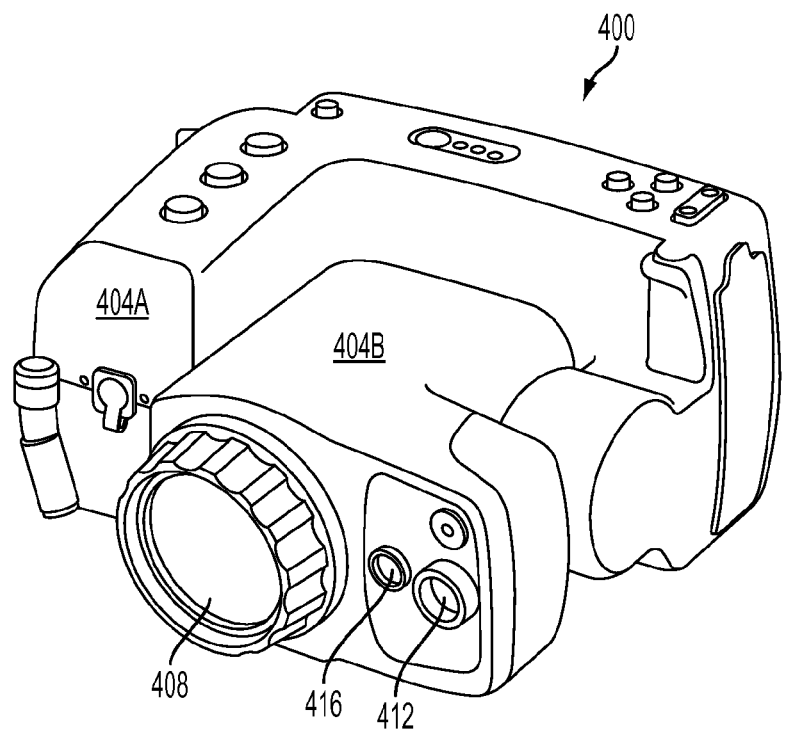
FIG. 4 is a front perspective view of a thermographic camera implementing a user-profile parameter-setting scheme.

Referring first to FIG. 4, in this example camera 400 includes an articulated housing 404 having a main body 404A and a sensor/lens pod 404B that is pivotably mounted to the main body. Sensor/lens pod 404B includes a thermographic lens 408 (and corresponding thermographic image sensor 600 (see FIG. 6)), a photographic lens 412 (and corresponding photographic image sensor 604) and a light-emitting-diode 416 for providing both flash and continuous photographic lighting.

Figure 5:
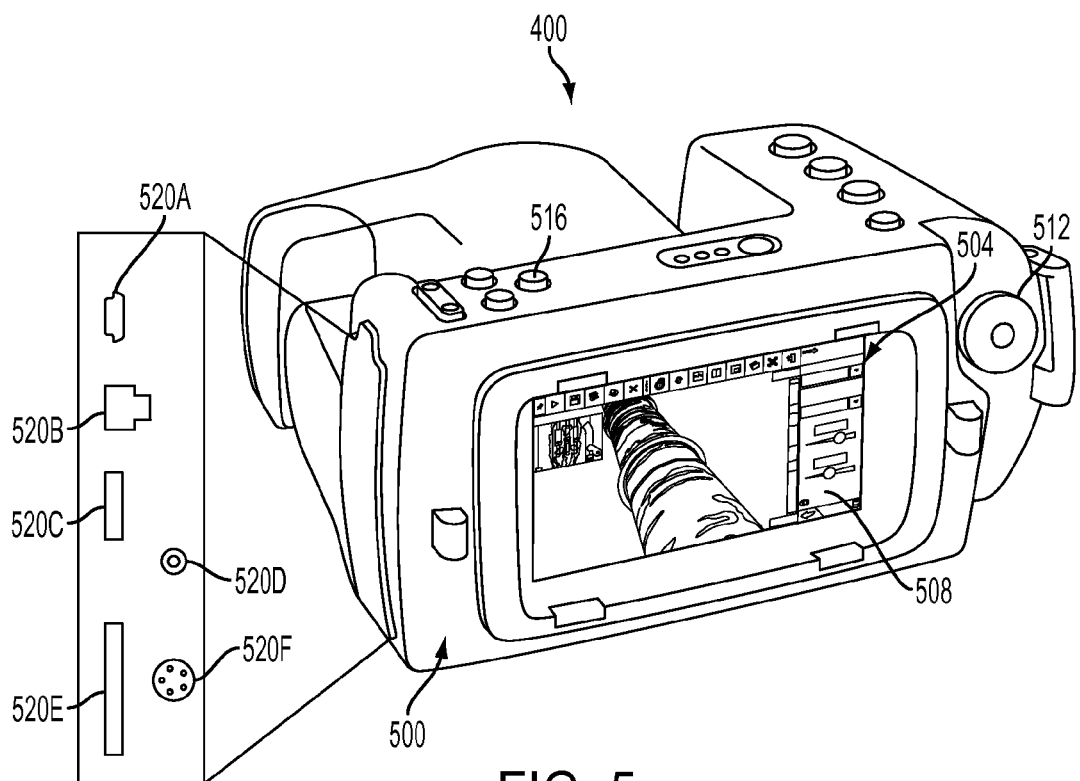
FIG. 5 is a rear perspective view of the thermographic camera of FIG. 4.

As seen in FIG. 5 camera 400 has a rear panel 500 that includes video display, for example a touchscreen display 504 or other sort of electronic flat-panel display. As described below in detail, in this example display 504 provides a number of functions, including a viewfinder for displaying one or more live images, a monitor for displaying one or more stored images and/or data relating to the live and/or stored images, a display for displaying a GUI 508 for camera 400, a display for one or more graphical tools and/or soft camera controls and an input device for receiving user input, e.g., via a finger or stylus, in conjunction with the graphical tools and/or soft camera controls. Camera 400 also includes a number of hard controls, such as joystick 512 and a user button 516. Joystick 512 can be used to navigate and make selections within GUI 508 to augment/supplement touch navigation and selection techniques available via touchscreen display 504. User button 516 is a button to which a user can assign a preferred use function to avoid having to navigate through GUI 508 each time the user desires to use the assigned function. Those skilled in the art will be readily familiar with the various types of soft and hard camera controls, such that they need not be described in any detail herein, other than to the extent necessary to describe how unique features of the present disclosure may be implemented.

Camera 400 further includes a variety of data ports 520A-F that can provide connection points for the transfer of data to and from one or more devices, for example, a memory card or other external storage device, a computer, such as a laptop computer, a docking station, etc. As those skilled in the art will readily appreciate, examples of data port types that data ports 520A-F may be include, without limitation, a memory card port, a parallel port, universal serial bus port, and RS 232 connector port, an Ethernet port, a video-signal port (analog or digital) or any other standard or proprietary port.

Figure 6:
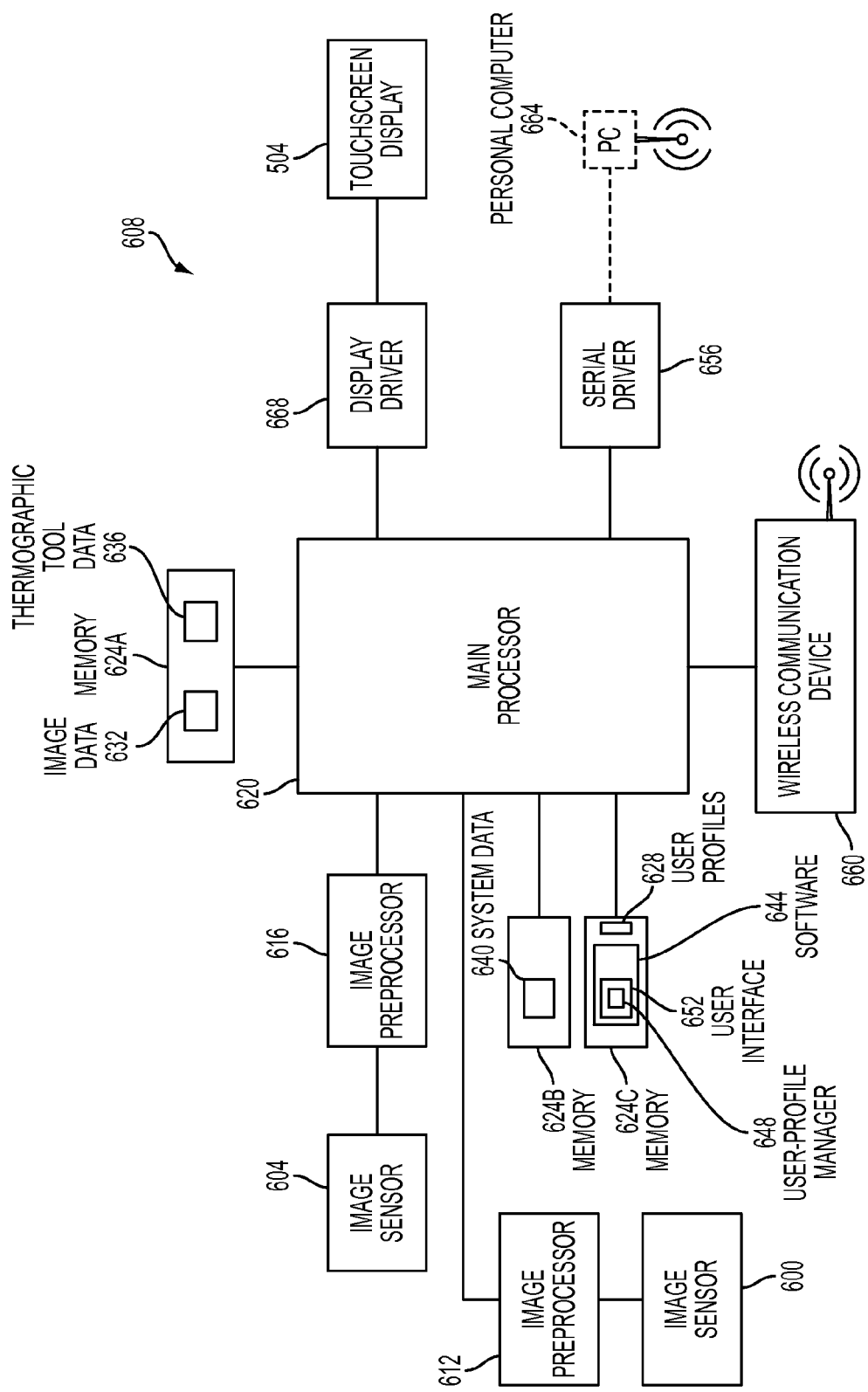
FIG. 6 is a high-level schematic diagram of the thermographic camera of FIG. 4.

FIG. 6 illustrates an exemplary system configuration 608 of various components of camera 400 of FIGS. 4 and 5 that provide the camera with its functionality, including the unique functionality described below. As mentioned above, camera 400 includes thermographic and photographic image sensors 600, 604. As those skilled in the art will readily appreciate each of image sensors 600, 604 may be any suitable type. In the present example, thermographic sensor 600 is a microbolometer uncooled focal plane array (available, e.g., from FLIR Systems, Inc., Wilsonville, Oreg.) and photographic image sensor 604 is a CMOS CCD 640×480 array with 24-bit color. Of course, these particular sensors are merely exemplary.

Each image sensor 600, 604 is in electrical communication with a corresponding image preprocessor 612, 616 that performs signal-processing functions on the raw output of the corresponding image sensor to provide a suitable processed image signal for further use. It is noted that in other embodiments, the functionality of preprocessors 612, 616 may be incorporated into a single preprocessor or even a multi-function or general-purpose processor, such as main processor 620. Those skilled in the art will readily understand the function of preprocessors 612, 616 such that further details need not be described in this disclosure. Main processor 620 may be composed of one or more integrated circuits (ICs) that generally controls the overall operation of camera 400 (FIGS. 4 and 5) and any lower level functionality that a designer may relegate to the main processor. Examples of ICs suitable for use as main processor 620 include, but are not limited to an application specific IC, a system-on-chip IC and a general-purpose processor IC.

System configuration 608 of camera 400 (FIGS. 4 and 5) also includes memories 624A-C in communication with main processor 620 for storing, among other things, user-profiles 628, image data 632, thermographic tool data 636, system data 640 and software 644 (including a user-profile manager 648) for controlling the camera and providing a user interface 652 to a user of the camera for controlling the various functions and features of the camera. As those skilled in the art, each memory 624A-C may be of any suitable type including fixed and removable memory.

Some or all of data ports 520A-F (also in FIG. 5) may have corresponding respective drivers, such as serial driver 656, depending on the port type. Those skilled in the art will understand driver requirements depending on the ports selected for use on camera 400. System configuration 608 may also include a wireless communication device 660 for communicating information to and from external equipment, such as personal computer 664. Examples of a wireless communication device suitable for use as wireless communication device 660 include, without limitation, a Bluetooth device (e.g., an IEEE 802.15.11 device), a WiFi device (e.g., an IEEE 802.11 device), etc. System configuration 608 may also include a display driver 668 electrically coupled between main processor 620 and touchscreen display 504 for controlling the operation of the display, i.e., the display of screen images, including live and stored visual and thermographic images, thermographic tools, soft camera controls, etc. Those of ordinary skill in the art are familiar with display drivers that may be used for display driver 668 such that it is not necessary to describe this driver in detail.

In this example, software 644 allows a user to set dozens of operating parameters of camera 400 with desired settings. For example, a user can select a color palette from among several palette choices to use when displaying an image, select a temperature span mode, select a temperature range, select whether or not touchscreen display displays a picture within a picture, set image calibration parameter such as emissivity, background temperature, atmospheric transmission value), set tool placement and set tool calibration, among others. In a predictive maintenance scenario, a user may be required to view many different kinds of equipment. For each different type of equipment, the user may prefer slightly different operating parameter settings in camera 400. For example, for high-temperature thermography, the user may prefer a higher temperature range and an "Ironbow" color palette, whereas, for investigating a fuse-box, the user may prefer a lower temperature range and a black-and-white color palette. As described below, user-profile manager 648 provides this user with the ability to create a user profile 628 for each imaging scenario where the user desires particular operating parameter settings for that scenario. After user profiles 628 have been saved, the user can then retrieve each of them and apply them to camera 400 as desired. In this connection, user-profile manager 648 is configured to allow quick recognition of a user profile 628 by the user. For example, user profile manager 648 allows the user to associate each profile with an infrared image and/or a visual image, along with a voice note explaining what that particular profile should be used for.

Figure 7:
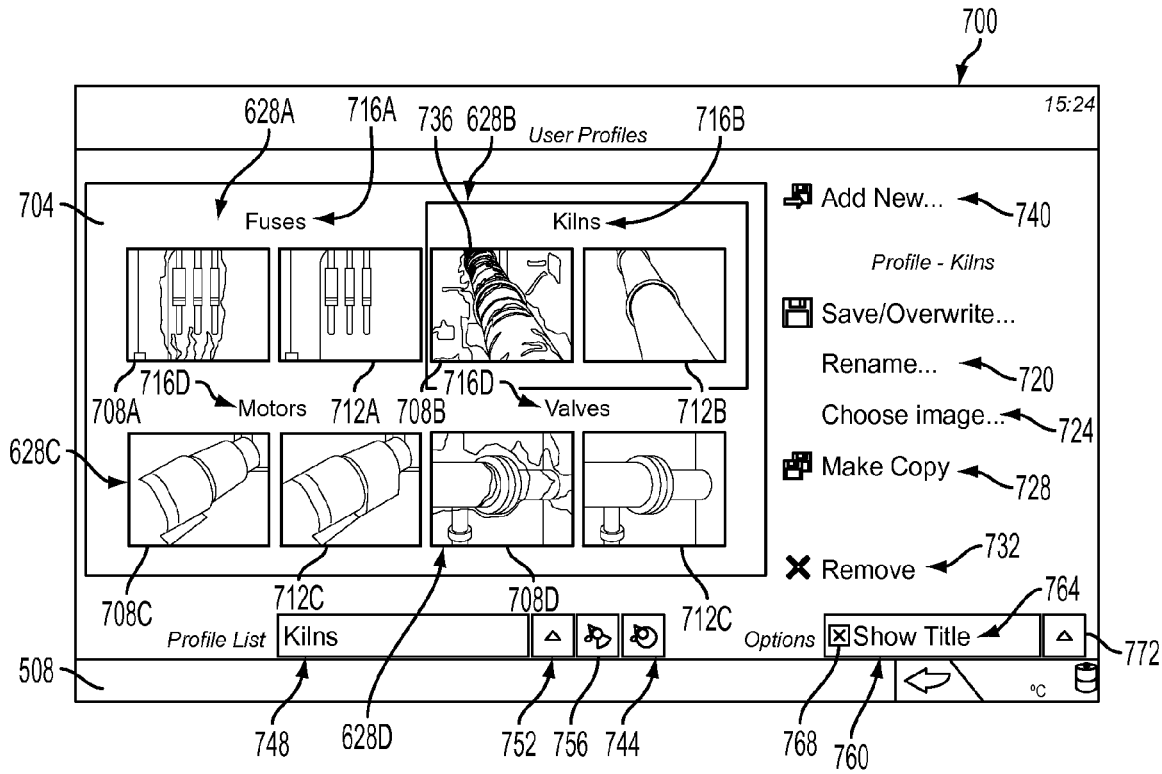
FIG. 7 is a screenshot of the graphical user interface (GUI) of the thermographic camera of FIG. 4, illustrating a user-profile manipulation screen.
Figure 8:
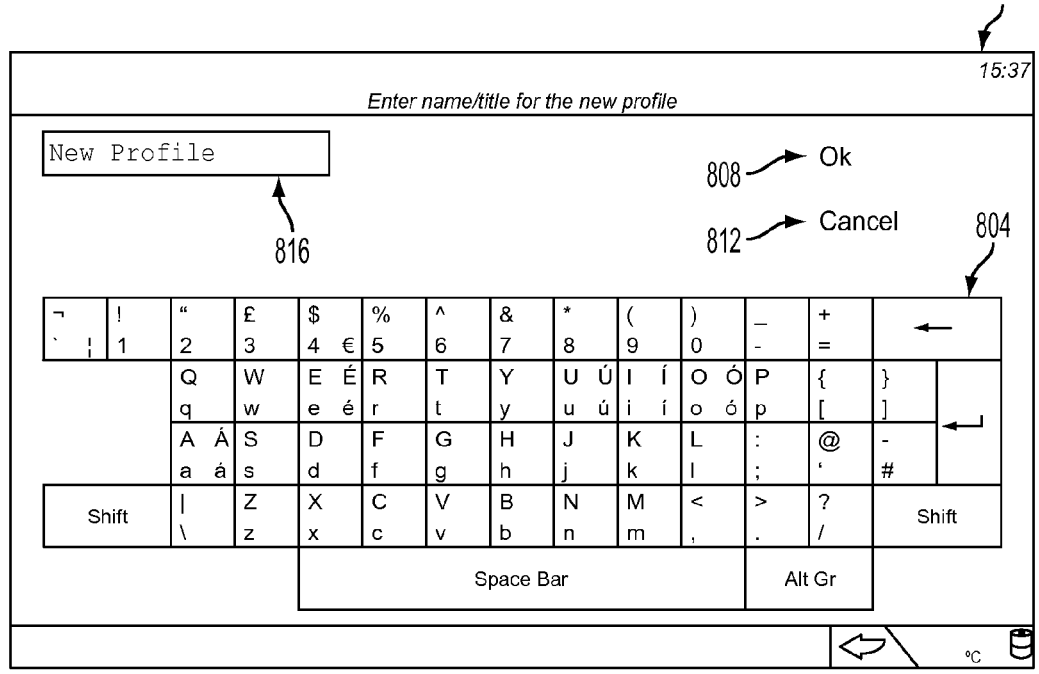
FIG. 8 is a screenshot of the GUI of the thermographic camera of FIG. 4, illustrating a title-input screen for inputting name scenario identifiers for associating with ones of user profiles.

Referring now to FIG. 7, and also to FIGS. 4-6, FIG. 7 illustrates a user-profile editing home screen 700 of GUI 508 that is provided to touchscreen 504 by user-profile manager 648. In this example, editing screen 700 allows a user to create and add new user profiles (not shown), modify/add scenario identifiers and copy and delete existing user profiles 628 that have already been stored in one of memories 624A-C. In the particular instance shown, editing screen 700 includes a stored profile pane 704 that displays scenario identifiers for four user profiles 628A-D already stored, here thermal images 708A-D, visible-light images 712A-D and names 716A-D. The scenario identifies for each of the four user profiles 628A-D shown form a selectable grouping. If a user wants to copy or delete one of user profiles 628A-D or wants to add to or modify the corresponding scenario identifier(s), the user can select that profile by, for example, touching or tapping on touchscreen 508 at the onscreen location of any one of the corresponding scenario identifiers 708A-D, 712A-D, 716A-D or moving a cursor to any one of the corresponding identifiers and pressing a selection button (e.g., using joystick 512), and then select the corresponding one or more of the desired soft selectors, here "Rename . . ." selector 720, "Choose image . . ." selector 724, "Make Copy" selector 728, "Remove" selector 732. In FIG. 7, user profile 628B is shown as being selected by the highlighting 736. The user can select any one of selectors 720, 724, 728, 732 using any of the techniques mentioned above for selecting one of user profiles 628A-D.

To add a new profile, the user would select "Add New . . . " selector 740, for example, using any one of the techniques mentioned above for selecting one of user profiles 628A-D. Before doing this, the user would first set one or more of the operating parameters of camera 400 to the desired setting(s). In response to the user selecting "Add New . . . " selector 740, user-profile manager 648 stores the then-current operating parameters in one of memories 624A-C and presents a naming screen 800 (FIG. 8) to the user via GUI 508, which is displayed on touchscreen 504. Naming screen 800 includes a soft keyboard 804 for entering a name/title, an "Ok" selector 808 for saving a name/title just entered and returning to editing screen 700 and a "Cancel" selector 812 for returning to the editing screen without saving any changes that may have been made. A title/name window 816 displays the title/name as it is appears before, during and/or after creation or revising.

Figure 9:
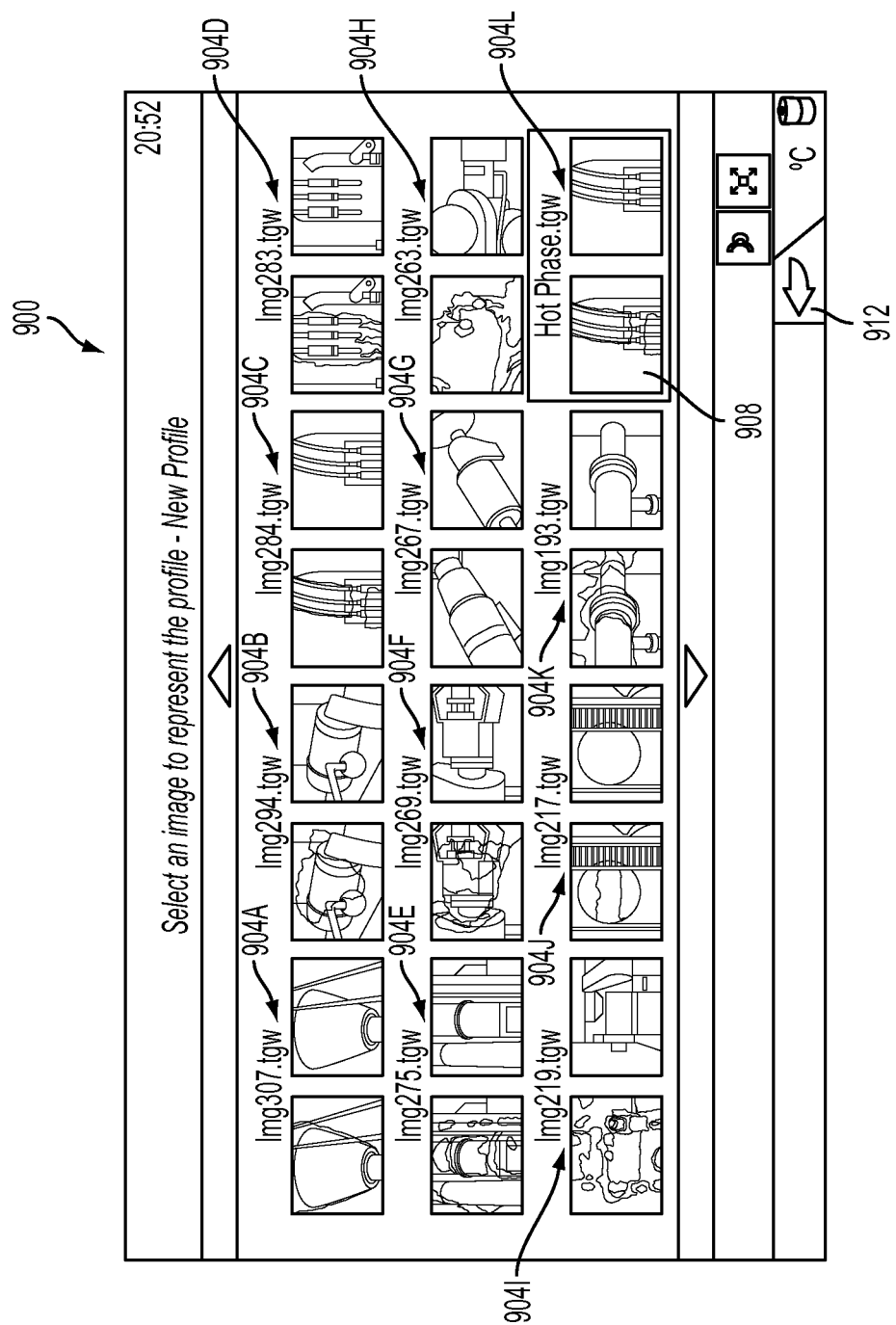
FIG. 9 is a screenshot of the GUI of the thermographic camera of FIG. 4, illustrating an image-selection screen for choosing image scenario identifiers to associate with ones of user profiles.

To associate one or more images to a user profile, the user would select "Choose image . . . " selector 724 on user-profile editor screen 700 (FIG. 7), for example, using any one of the techniques mentioned above for selecting one of user profiles 628A-D. In response to selecting "Choose image . . . " selector 724, user-profile manager 648 presents an image-selection screen 900 (FIG. 9) to the user via GUI 508, which is displayed on touchscreen 504. Referring briefly to FIG. 9, image-selection screen 900 displays images of image files, here files 904A-L, that are available for use as scenario identifiers for user profiles. In this example, each image file 904A-L contains both a thermal image and a visible-light image. However, in other circumstances, for example, wherein camera 400 is set to a thermal-image-only mode or a visible-image-only mode, each image file may only contain a single image. Image-selection screen 900 allows a user to select a desired one of the image files, for example, using any one of the techniques mentioned above for selecting one of user profiles 628A-D. Here, image file 904L having the filename "Hot Phase.tgw" has been selected, as indicated by highlighting 908. Once selected, an image file can be de-selected using any one of the selecting techniques noted above. If a user has selected an image-file and wants the images therein to be associated with the user profile currently being edited using user-profile editing home screen 700, while the selected image file is highlighted the user would select return control 912 that returns GUI 508 to the user-profile editing home screen. When an image file is associated with a user profile, if it is not currently stored in onboard long-term memory (e.g., if it is on a removable memory card), user-profile manager 648 will copy that file over to the onboard long-term memory so that it will be available even if the user removes the memory card. User-profile manager 648 will also create a record of the association, for example, using a lookup table, which the user-profile manager will also store in onboard long-term memory.

Figure 10:
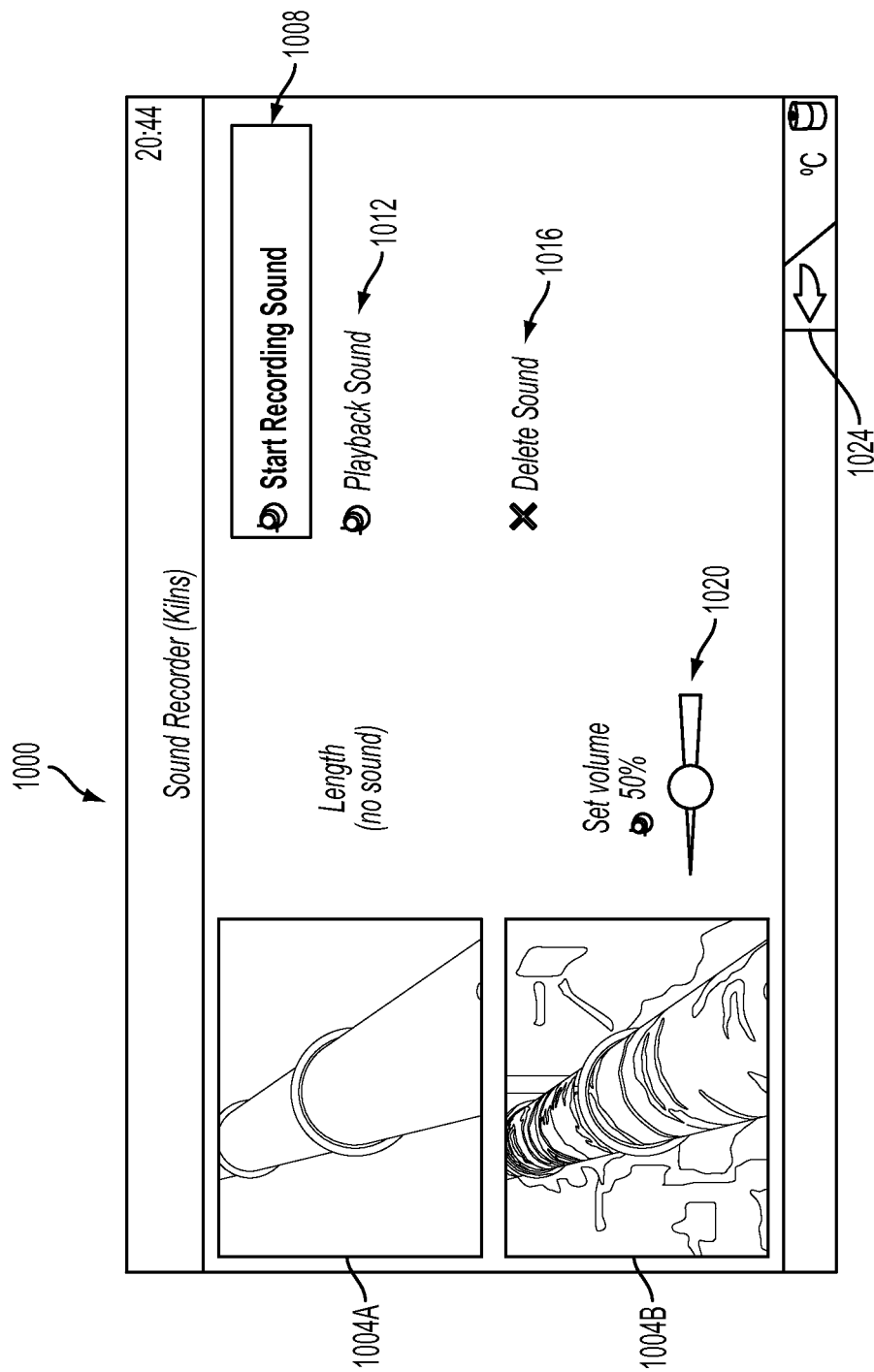
FIG. 10 is a screenshot of the GUI of the thermographic camera of FIG. 4, illustrating a voice-note creation screen for creating voice-note scenario identifiers for associating with ones of user profiles.

In addition to associating images with user profiles, the user can also associate a voice note with each of the user profiles, if desired. If so, the user can select record-voice-note control 744 on user-profile editing home screen 700 (FIG. 7), for example, using any one of the techniques mentioned above for selecting one of user profiles 628A-D. In response to record-voice-note control 744, user-profile manager 648 presents a voice-note editing screen 1000 (FIG. 10) to the user via GUI 508 on touchscreen 504. Referring briefly to FIG. 10, a voice-note editing screen 1000 displays any images 1004A-B currently associated with the user profile currently selected on user-profile editing home screen 700 (FIG. 7), here "Kilns" user profile 628B. Voice-note editing screen 1000 also includes a "Start Recording Sound" control 1008, a "Playback Sound" control 1012, a "Delete Sound" control 1016 and a "Set Volume" slider control 1020, each of which has the function suggested by its name. In FIG. 10, "Start Recording Sound" control 1008 is highlighted, indicating that camera 400 has created a unique sound file and is recording sound it picks up via a microphone (not shown) built into the camera. While camera 400 is recording, the user can speak whatever voice note desired to be recorded. When the user is done speaking, the user can simply de-select "Start Recording Sound" selector 1008 using any one of the selection techniques noted above. When the user is done recording, the user can select return control 1024 to return GUI 508 to user-profile editing home screen 700. User-profile manager 648 associates the sound file created to the user profile selected on user-profile editing home screen 700, here user profile 628D.

Referring back to FIG. 7, user-profile editing home screen 700 also includes a couple of other features. For example, user-profile editing home screen 700 includes a "Profile List" dropdown list 748 that allows a user to select a desired one of already-stored user profiles 628. This provides an alternative selection mechanism to the select-a-scenario-identifier mechanism described above. The user activates dropdown list 748 using a list control 752. When dropdown list 748 appears, the user can scroll through it and make a selection using known scrolling and selection techniques. In response to a selection being made from dropdown list 748, user-profile manager 648 will highlight the corresponding scenario identifier(s) in stored profile pane 704, above. Adjacent to list button 752 is a play-voice-note control 756 that allows a user to review the voice note associated with the user profile that is currently selected. If an associated voice note does not exist, play-voice-note control 756 will be "grayed-out" as it is in this example, meaning that this button is not selectable.

User-profile editing home screen 700 also includes an "Options" dropdown list 760 that allows a user to customize the presentation of scenario identifiers, such as thermal images 708A-D, visible-light images 712A-D and names 716A-D to the user when camera 400 is in a use mode, i.e., when the camera is not in a user-profile editing mode and the user can select any of stored user profiles 628 for application to an imaging scenario. As described below, during such camera operation, a list of stored user profiles 628 can be viewed in a quick-access mode, which a user can readily enter by assigning it to user button 516 so that the user can access the quick-access mode by the push of a single button. Options available for customizing the presentation of scenario identifiers include a "Show Title" option 764 (shown as being selected in FIG. 7 by virtue of checkbox 768 being checked), a "Show Visible-Light Image" option (not shown, but having a corresponding checkbox), a "Show Thermal Image" option (not shown, but also having a corresponding checkbox) and a "Show Voice Note Icon" option (not shown, but also having corresponding checkbox). The options not seen in FIG. 7 can be revealed by the user selecting a list control 772 that activates the dropdown aspect of "Options" dropdown list 760. When "Options" dropdown list 760 is active, the user can check and uncheck checkboxes 768 as desired to customize the presentation of user profiles 628.

Figure 11:
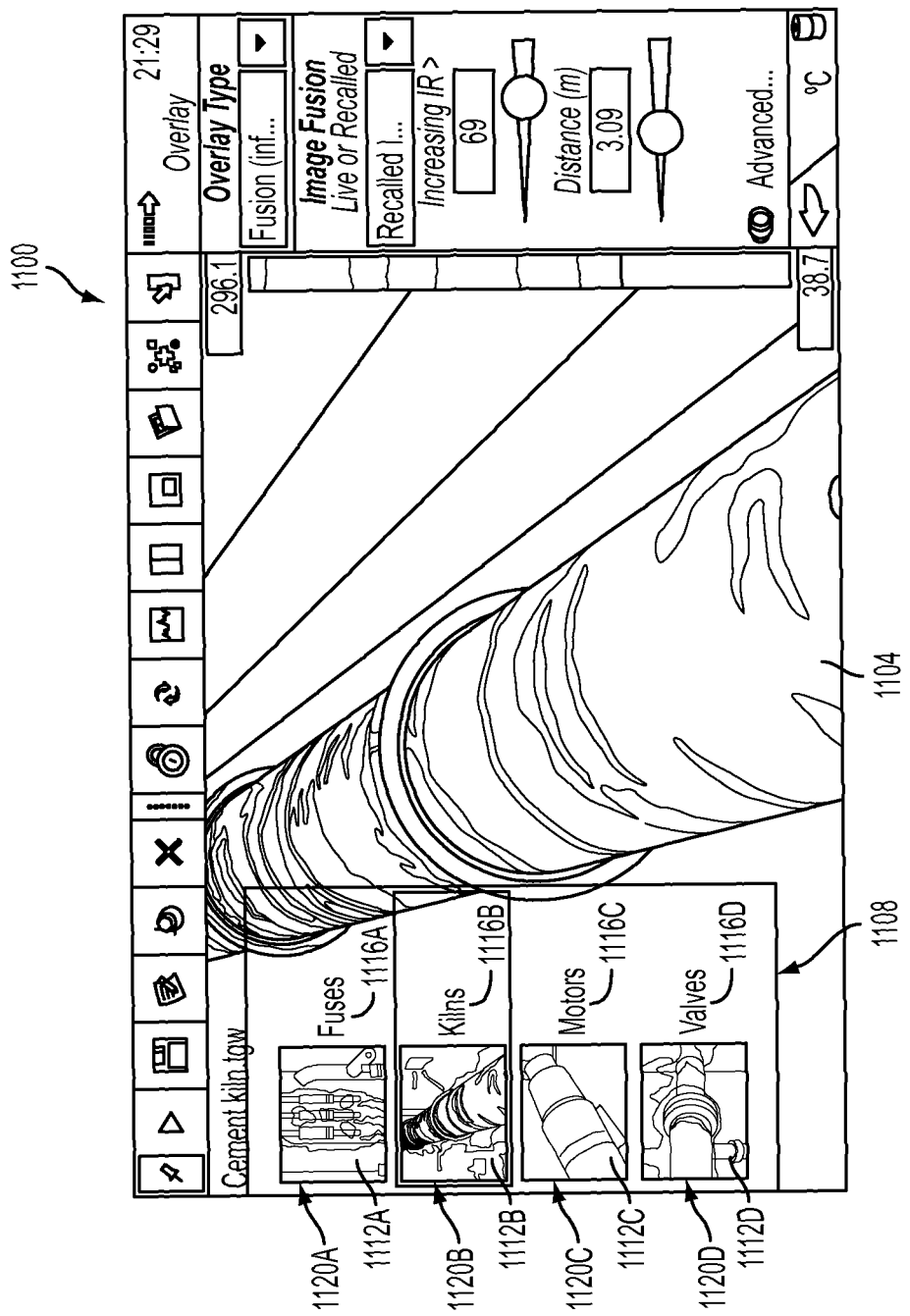
FIG. 11 is a screenshot of the GUI of the thermographic camera of FIG. 4, showing a working screen with an overlain user-profile access list that utilizes thermal-image and name scenario identifiers to represent user-profiles in the access list.

FIGS. 11-14 illustrate the look of GUI 508 (FIG. 5) when the user has selected various sets of option in "Options" dropdown list 760 (FIG. 7). FIG. 11 illustrates a working-mode screen 1100 (as opposed to a user-profile setup screen, e.g.,) that displays a thermal image 1104 (here, a recall thermal image having the filename "Cement kiln.tgw", but can also be a live image) with a user-profile quick-access list 1108 overlying the thermal image. As mentioned above, the user can cause camera 400 (FIG. 4) to display quick-access list 1108 by pressing user button 516 (FIG. 5) if such function has been assigned to this button. In this example, the user has selected, in "Options" dropdown list 760 (FIG. 7), to display for each user profile in user-profile quick-access list 1108 a thermal-image scenario identifier 1112A-D and a user-profile-name scenario identifier 1116A-D corresponding to that user profile. To select one of the user-profiles represented by thermal-images scenario identifiers 1112A-D and user-profile-name scenario identifiers 1116A-D, the user can, for example, touch touchscreen 504 (FIG. 5) at the one of regions 1120A-D of user-profile quick-access list 1108 corresponding to the desired user profile. Alternatively, the user could navigate a cursor (not shown) using joystick 512 (FIG. 5) to that one of regions 1120A-D and, while the cursor is located in that region, press the joystick, which in this example also functions as a selection button. In response to the desired user profile being selected, camera 400 sets various ones of its operating parameters with the settings stored in the selected user profile.

Figure 12:
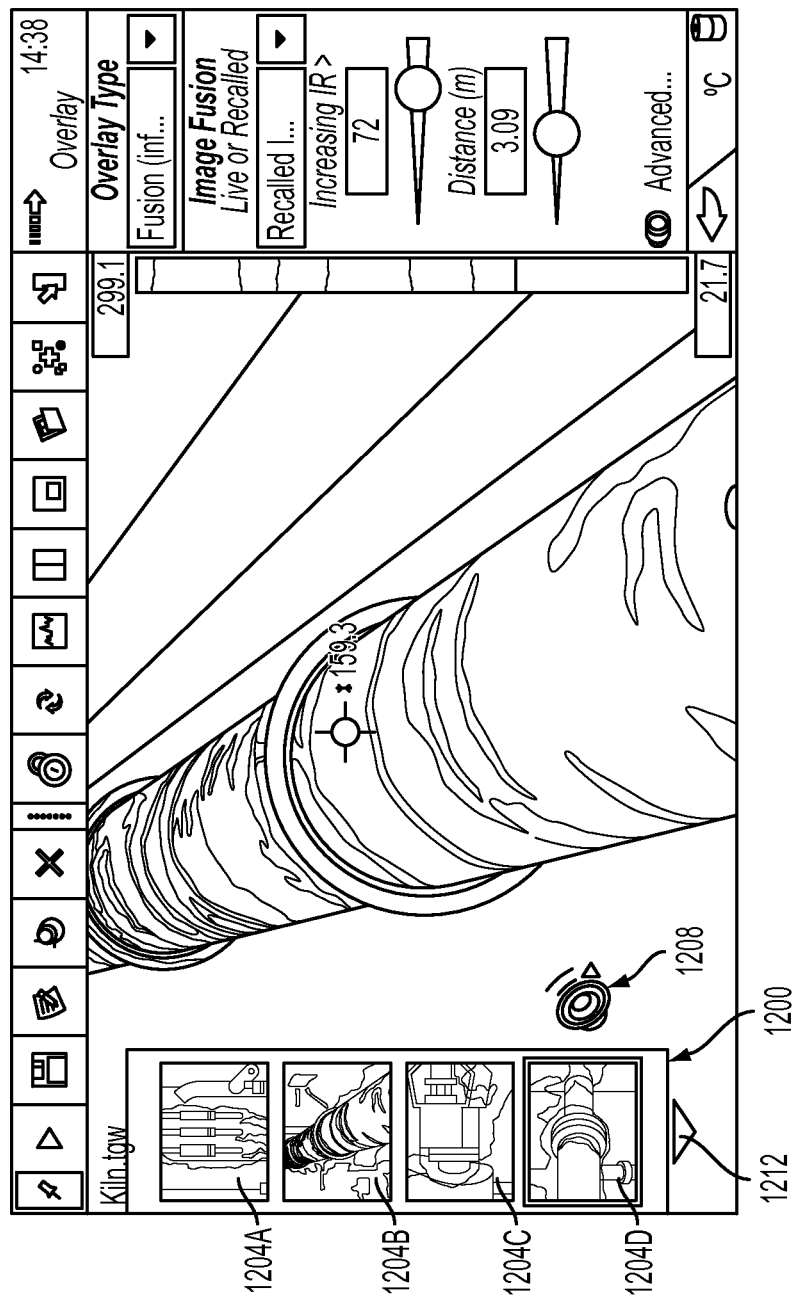
FIG. 12 is a screenshot of the GUI of the thermographic camera of FIG. 4, showing a working screen with an overlain user-profile access list that utilizes thermal-image and voice-note scenario identifiers to represent user-profiles in the access list.

FIG. 12 is largely the same as FIG. 11, but shows an alternatively configured user-profile quick-access list 1200. In this example of user-profile quick-access list 1200, each user profile is represented by a thermal-image scenario identifier 1204A-D and, if available a recorded-voice-note scenario identifier, which is represented in the quick-access list by speaker icon 1208. Again, the user can cause camera 400 (FIG. 4) to display quick-access list 1200 by pressing user button 516 (FIG. 5) if such function has been assigned to this button. Alternatively, the user can navigate to the list using other features of GUI 508 (FIG. 5) that are not illustrated. In this example, the user has selected, in "Options" dropdown list 760 (FIG. 7), to display for each user profile in user-profile quick-access list 1200 a corresponding thermal-image scenario identifier 1204A-D and, if a voice note exists for that user profile, a sound icon 1208. The user can select a desired user profile, for example, by touching touchscreen 504 (FIG. 5) at the one of thermal-image scenario identifiers 1204A-D of user-profile quick-access list 1200 corresponding to that user profile. Alternatively, the user could navigate a cursor (not shown) using joystick 512 (FIG. 5) to that one of thermal-image scenario identifiers 1204A-D and, while the cursor is located in that identifier, press the joystick. In response to the desired user profile being selected, camera 400 sets various ones of its operating parameters with the settings stored in the selected user profile. If the user wants to review the voice note corresponding to the user profile represented by thermal-image scenario identifier 1204C, the user could touch touchscreen 504 at sound icon 1208 or navigate to and select the sound icon using joystick 512. In this example, there are more user profiles than there is room to display the corresponding thermal-image scenario identifiers 1204A-D, so GUI 508 (FIG. 5) provides a scroll-down soft button 1212 that a user can use to see more identifiers not already displayed.

Figure 13:
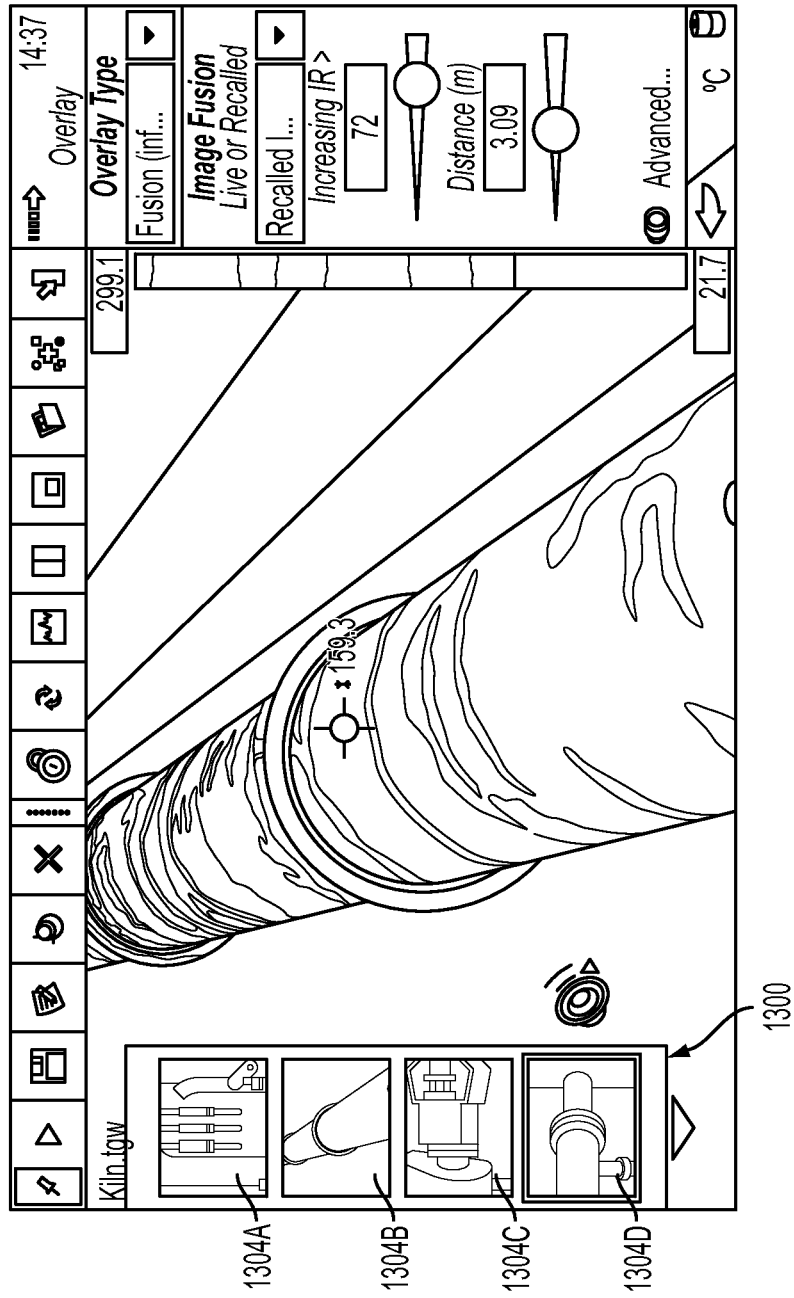
FIG. 13 is a screenshot of the GUI of the thermographic camera of FIG. 4, showing a working screen with an overlain user-profile access list that utilizes visible-light-image and voice-note scenario identifiers to represent user-profiles in the access list.
Figure 14:
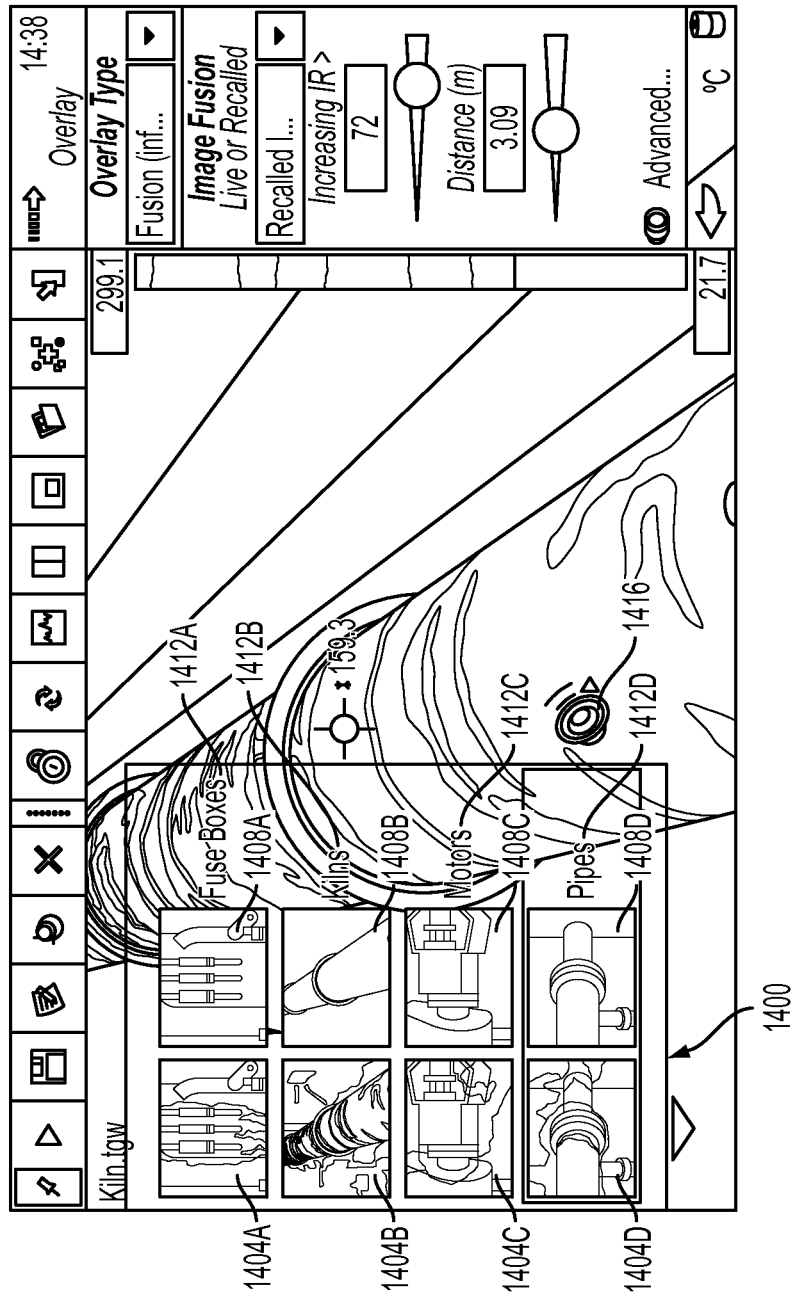
FIG. 14 is a screenshot of the GUI of the thermographic camera of FIG. 4, showing a working screen with an overlain user-profile access list that utilizes thermal-image, visible-image, name and voice-note scenario identifiers to represent user-profiles in the access list.

FIG. 13 is essentially the same as FIG. 12, except that the user-profile quick-access list 1300 utilizes visible-light-image scenario identifiers 1304A-D in place of the thermal-image scenario identifiers 1204A-D of FIG. 12. The user set this configuration by selecting only the "Show Visible-Light Image" and "Display Voice-Note Icon" options in "Options" dropdown list 760 (FIG. 7). All functionality of quick-access list 1300 can be the same as the functionality described above relative to user-profile quick-access list 1200 of FIG. 12. FIG. 14 is essentially the same as each of FIGS. 12 and 13, except that the user-profile quick-access list 1400 utilizes not only thermal-image scenario identifiers 1404A-D and visible-light-image scenario identifiers 1408A-D, but also user-profile name scenario identifiers 1412A-D and voice-note scenario identifiers (represented by sound icon 1416), as well. The user set this configuration by selecting all of the "Show Thermal Image", "Show Visible-Light Image", "Show Title" and "Display Voice-Note Icon" options in "Options" dropdown list 760 (FIG. 7). All functionality of quick-access list 1400 can be the same as the functionality described above relative to user-profile quick-access lists 1108 and 1200 of FIGS. 11 and 12, respectively.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A method changing at least one operating parameter of an imaging device to adapt the imaging device to an imaging scenario, the method comprising:
storing on the imaging device a plurality of user profiles each having associated therewith at least one operating parameter setting set by a user, wherein each of the plurality of user profiles corresponds to a respective imaging scenario;
storing on the imaging device a plurality of scenario identifiers corresponding respectively to the plurality of user profiles;
displaying on the imaging device one or more scenario identifiers of the plurality of scenario identifiers, wherein:
each scenario identifier of the plurality of scenario identifiers comprises an image;
the image is a previously captured image according to a corresponding imaging scenario; and
at least one of the one or more scenario identifiers includes a previously captured thermographic image;
allowing the user to select a desired one of the user profiles as a function of the corresponding respective one of the plurality of scenario identifiers; and
in response to detecting a user selection of the desired one of the user profiles, implementing in the imaging device the at least one operating parameter setting associated with the desired one of the user profiles.

2. A non-transitory machine-readable medium containing non-transitory machine-executable instructions for performing a method changing at least one operating parameter of an imaging device to adapt the imaging device to an imaging scenario, said non-transitory machine-executable instructions comprising:
a first set of machine-executable instructions for storing on the imaging device a plurality of user profiles each having associated therewith at least one operating parameter setting set by a user, wherein each of the plurality of user profiles corresponds to a respective imaging scenario;
a second set of machine-executable instructions for storing on the imaging device a plurality of scenario identifiers corresponding respectively to the plurality of user profiles;
a third set of machine-executable instructions for displaying on the imaging device one or more scenario identifiers of the plurality of scenario identifiers, wherein:
each scenario identifier of the plurality of scenario identifiers comprises an image;
the image is a previously captured image according to a corresponding imaging scenario; and
at least one of the one or more scenario identifiers includes a previously captured thermographic image;
a fourth set of machine-executable instructions for allowing the user to select a desired one of the user profiles as a function of the corresponding respective one of the plurality of scenario identifiers; and
a fifth set of machine-executable instructions for implementing in the imaging device the at least one operating parameter setting associated with the desired one of the user profiles in response to detecting a user selection of the desired one of the user profiles.

3. A method according to claim 1, wherein the imaging device is a thermographic imaging device having on-screen thermographic tool functionality and the at least one operating parameter controls the on-screen thermographic tool functionality.

4. A non-transitory machine-readable medium containing non-transitory machine-executable instructions for performing a method changing at least one operating parameter of an imaging device to adapt the imaging device to an imaging scenario, said non-transitory machine-executable instructions comprising:
a first set of machine-executable instructions for storing on the imaging device a plurality of user profiles each having associated therewith at least one operating parameter setting set by a user, wherein each of the plurality of user profiles corresponds to a respective imaging scenario;

a second set of machine-executable instructions for storing on the imaging device a plurality of scenario identifiers corresponding respectively to the plurality of user profiles;

a third set of machine-executable instructions for displaying on the imaging device ones of the plurality of scenario identifiers, wherein the plurality of scenario identifiers comprises a plurality of images each depicting a corresponding imaging scenario and said machine-executable instructions for displaying includes machine-executable instructions for displaying ones of the plurality of images, further wherein said machine-executable instructions for displaying ones of the plurality of images includes machine-executable instructions for displaying ones of a plurality of thermographic images;

a fourth set of machine-executable instructions for allowing the user to select a desired one of the user profiles as a function of the corresponding respective one of the plurality of scenario identifiers; and a fifth set of machine-executable instructions for implementing in the imaging device the at least one operating parameter setting associated with the desired one of the user profiles in response to detecting a user selection of the desired one of the user profiles.

5. An imaging device having operating parameters settable by a user, comprising:

an image-sensor system having a first sensor for acquiring images;

a user-interface system configured to display images acquired by said image-sensor system and to display a graphical user interface to a user;

a user-profile manager that:
  stores on the imaging device a plurality of user profiles each having associated therewith at least one operating parameter setting set by a user, wherein each of the plurality of user profiles corresponds to a respective imaging scenario;
  stores on the imaging device a plurality of scenario identifiers corresponding respectively to the plurality of user profiles;
  is configured to display on the imaging device one or more scenario identifiers of the plurality of scenario identifiers, wherein:
    each scenario identifier of the plurality of scenario identifiers comprises an image;
    the image is a previously captured image according to a corresponding imaging scenario; and
    at least one of the scenario identifiers includes a previously captured thermographic image;
  allows the user to select a desired one of the user profiles as a function of the corresponding respective one of the plurality of scenario identifiers; and
  in response to detecting a user selection of the desired one of the user profiles, implements in the imaging device the at least one operating parameter setting associated with the desired one of the user profiles; and a memory system for storing the user-profile settings data and storing the at least one scenario identifier in association with the user-profile settings data.

6. A non-transitory machine-readable medium according to claim 4, wherein the imaging device is a thermographic imaging device having on-screen thermographic tool functionality and the at least one operating parameter controls the on-screen thermographic tool functionality.

7. An imaging device having operating parameters settable by a user, comprising:

an image-sensor system having a first sensor for acquiring images;

a user-interface system configured to display images acquired by said image-sensor system and to display a graphical user interface to a user;

a user-profile manager that:
  stores on the imaging device a plurality of user profiles each having associated therewith at least one operating parameter setting set by a user, wherein each of the plurality of user profiles corresponds to a respective imaging scenario;
  stores on the imaging device a plurality of scenario identifiers corresponding respectively to the plurality of user profiles;
  is configured to display on the imaging device ones of said plurality of scenario identifiers, wherein the plurality of scenario identifiers comprises a plurality of images each depicting a corresponding imaging scenario and said user-profile manager is configured to display ones of the plurality of images, further wherein said user-profile manager is configured to display ones of a plurality of thermographic images;
  allows the user to select a desired one of the user profiles as a function of the corresponding respective one of the plurality of scenario identifiers; and
  in response to detecting a user selection of the desired one of the user profiles, implements in the imaging device the at least one operating parameter setting associated with the desired one of the user profiles; and a memory system for storing the user-profile settings data and storing the at least one scenario identifier in association with the user-profile settings data.

8. An imaging device according to claim 7, wherein the imaging device is a thermographic imaging device having selectable color palettes and the at least one operating parameter controls selection from among the selectable color palettes.

9. An imaging device according to claim 7, wherein the imaging device is a thermographic imaging device having on-screen thermographic tool functionality and the at least one operating parameter controls the on-screen thermographic tool functionality.

* * * * *

UNITED STATES PATENT AND TRADEMARK OFFICE
CERTIFICATE OF CORRECTION

PATENT NO. : 9,083,875 B2
APPLICATION NO. : 13/621975
DATED : July 14, 2015
INVENTOR(S) : Richard Salisbury et al.

It is certified that error appears in the above-identified patent and that said Letters Patent is hereby corrected as shown below:

Claims

- Column 16, line 21, claim 2 of the issued patent was omitted in its entirety, and in its place claim 4 was duplicated. It is respectfully requested that claim 2 be corrected to read as follows:

"A method according to claim 1, wherein the imaging device is a thermographic imaging device having selectable color palettes and the at least one operating parameter controls selection from among the selectable color palettes."

- Column 17, line 28, claim 5 of the issued patent was omitted in its entirety, and in its place claim 7 was duplicated. It is respectfully requested that claim 5 be corrected to read as follows:

"A non-transitory machine-readable medium according to claim 4, wherein the imaging device is a thermographic imaging device having selectable color palettes and the at least one operating parameter controls selection from among the selectable color palettes."

Signed and Sealed this
Twenty-eighth Day of June, 2016

Michelle K. Lee
*Director of the United States Patent and Trademark Office*